April 23, 1974     W. H. DARR, SR     3,806,379

METHOD FOR HEAT TREATING COULTER BLADES

Filed March 13, 1972     2 Sheets-Sheet 1

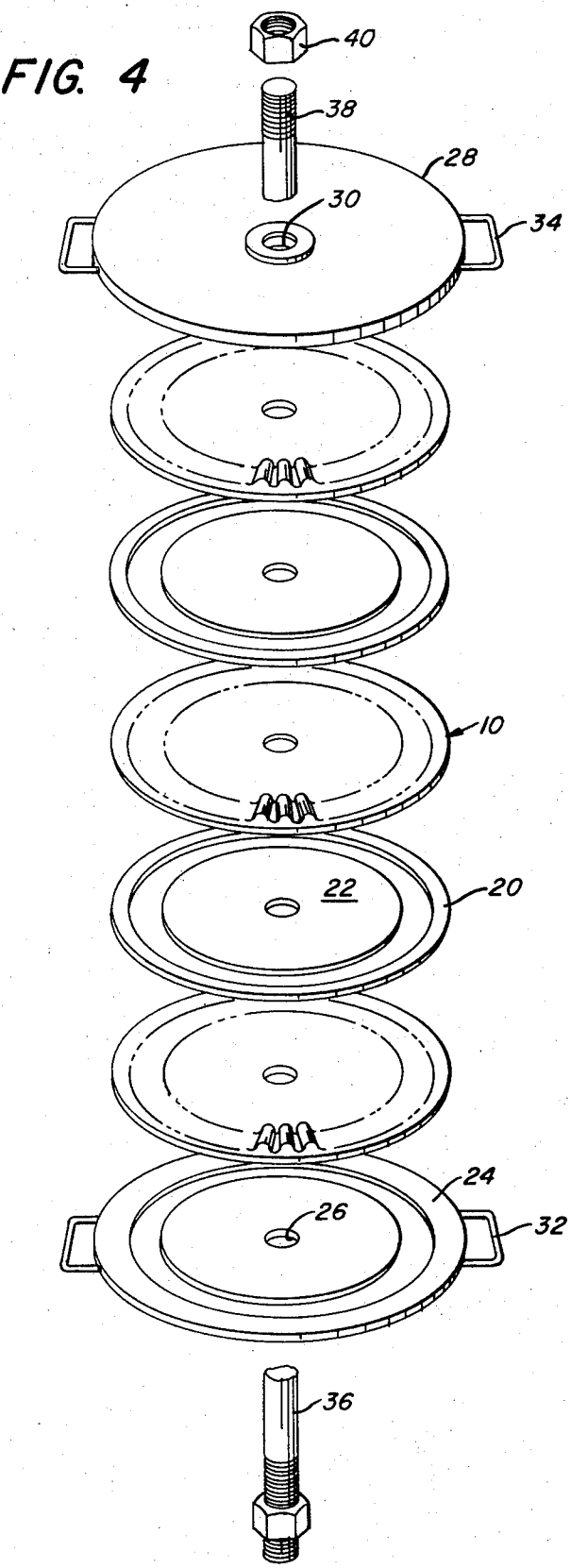

United States Patent Office 3,806,379
Patented Apr. 23, 1974

3,806,379
METHOD FOR HEAT TREATING COULTER BLADES
William H. Darr, Sr., Beaver Falls, Pa., assignor to Crucible Inc., Pittsburgh, Pa.
Filed Mar. 13, 1972, Ser. No. 234,106
Int. Cl. C21d 1/00, 1/58
U.S. Cl. 148—131                              8 Claims

ABSTRACT OF THE DISCLOSURE

A method for heat treating coulter blades to prevent distortion comprising austenitizing, rapidly quenching to a temperature greater than room temperature and while warm stacking the discs axially; maintaining adjacent discs out of contact and under axial compression during a subsequent annealing, and finally cooling to room temperature.

---

This invention relates to the production of coulter blades but it is to be understood that this term as used herein may relate to all types of agricultural discs wherein heat treatment resulting in distortion will occur, such as, in addition to coulter blades, harrow discs, planter wheels and the like for use with various types of earthworking equipment such as tillers, cultivators, planters, fertilizer distributors and the like. Coulter blades, to which the invention has particular utility, are conventionally used with plows for the purpose of cutting into the soil immediately in advance of the plow share. In performing the required trash cutting and surface breaking function the blade must penetrate beneath the surface of the earth and rotate during its travel. If the coulter does not rotate surface trash will be merely pushed ahead of the coulter rather than being severed. To provide the required turning action for the coulter a series of projections in the form of ripples or corrugations have been provided on the surface of the coulter, said corrugations terminating short of the coulter periphery to define the cutting action. Consequently, with this combination turning action is provided by the corrugations and the desired cutting action is provided by the sharpened edge.

It has been found, however, when these blades are heat treated to provide the required combination of hardness and strength, as by conventional austenitizing, quenching and annealing, the blades become characterized by distortion, particularly resulting in the edge of the blade being wavy. This is obviously unsuitable in that any use of a blade so distorted would result in a lack of proper turning action and ineffective cutting.

It is therefore the primary object of the present invention to provide a method for heat treating coulter blades that prevents during heat treatment distortion of the blade.

The foregoing, as well as other objects and advantages of the invention, will be apparent from the following description and drawings in which:

FIG. 4 is an exploded view of the assembly of FIG. 1 used in the practice of the invention.

Figure 2:
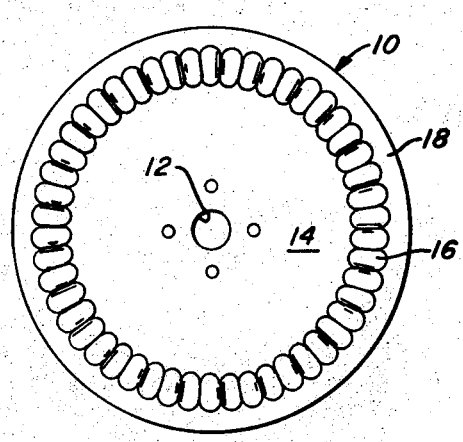
FIG. 2 is a plan view of a coulter blade of the type to which the invention is specifically directed.

With reference to the drawings, the coulter blade, as shown in FIG. 2, is fabricated in the well-known manner to provide a metal plate 10 of generally circular configuration. The plate may typically be of a thickness of .15" with a diameter on the order of 17" to 24". It is constructed of plain carbon steel possibly modified with increased manganese; particularly the composition is within the range of .80 to .93% carbon, 1 to 1.3% manganese, .015% max. phosphorus, .015% max. sulfur, .15 to .25% silicon, with the balance iron. The plate 10 has a central concentric circular opening 12 for accommodating an axle (not shown) of the earth-working apparatus with which the disc is used. Surrounding the opening 12 is a substantially flat smooth inner ring portion 14 of relatively large area. The ring portion 14 of the disc terminates at a continuous band of corrugations or ripples 16 formed along the disc surface. The corrugations 16 are typically formed by alternately offsetting adjacent areas along the disc surface. The corrugations terminate a distance short of the disc edge, which typically may be on order of ½" to form a substantially flat circumferential margin 18. The margin 18 is tapered and beveled toward the disc periphery, which provides a sharp, continuous cutting edge for the disc. The width of the margin 18 may vary within the range of ⅜ to 2", with the width increasing with increases in the diameter of the disc.

Figure 1:
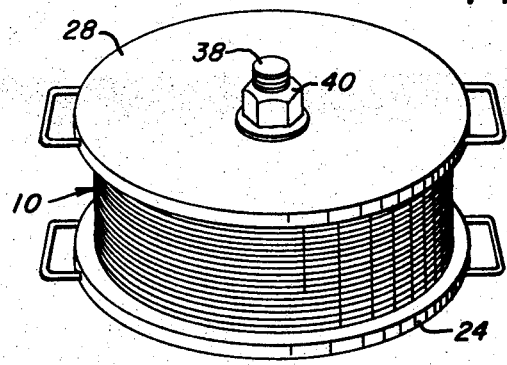
FIG. 1 is a perspective view in assembly of a plurality of coulter blades stacked for treatment in accordance with the invention.
Figure 3:
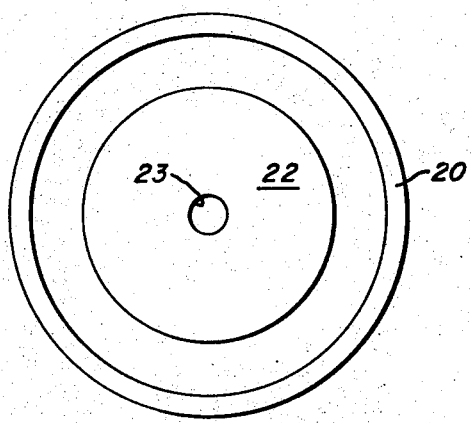
FIG. 3 is a plan view of spacers used between the stacked coulter blades in accordance with the present invention.

In accordance with the practice of the invention the coulter blades as shown in FIG. 2 are stacked vertically in axial alignment with a spacer 20 adjacent the margin portion and a spacer 22, as shown in FIG. 3, adjacent the inner ring portion. The spacers typically have a thickness of about ¼" but in any event must be of a thickness sufficient to maintain adjacent coulter blades out of contact in the stack. Typically about 20 discs are provided in the stack. The discs, with the spacers therebetween, are placed atop a circular bottom plate 24 having a diameter substantially in excess of that of the discs and having a central opening 26 therein. The top of the stack is likewise provided with a similar plate 28 having opening 30. To facilitate handling plates 24 and 28 may be provided with handles 32 and 34 respectively. A bolt 36, as best shown in FIGS. 1 and 4, passes upwardly through the bottom plate 24, spacers 22, discs 10 and upper plate 28 and projecting from the upper plate is a threaded portion 38 onto which a nut 40 is engaged and tightened to place the entire assembly as shown in FIG. 1 in axial compression. For this purpose a tightenening of the nut 40 with a torque of about 300-foot pounds has been found to be sufficient.

The assembly, as described above and shown in the figures consists of discs that have been conventionally austenitized to a temperature of, for example 1600° F. and then rapidly oil quenched to retain the austenitic structure, which typically requires about 50 seconds whereupon a hardness of about 580 to 600 Brinell is obtained. The discs are placed in the assembly as shown and described hereinabove prior to cooling to room temperature and specifically when they are within the temperature range of about 200 to 325° F., typically at about 300° F.

The assembly as shown in FIG. 1 is then annealed for about 4 to 5 hours within the range of about 900 to 950° F., typically 920° F. Four to five hours at annealing temperature is sufficient for a typical assembly comprising about 20 discs. It is to be understood of course that the required annealing time depends upon the mass, with the time increasing with increased mass. In any event, however, annealing is performed to achieve a coulter blade having a final annealed hardness within the range of 380 to 490 Brinell. After annealing it is necessary that the product be cooled while maintained under compression within the assembly; otherwise the coulter blade will distort and particularly be characterized by a wavy edge configuration.

Although FIG. 4 shows only three coulter blades in the assembly this is done merely for clarity of illustration and it is to be understood that typically about 20 of the blades would be used in each stack.

The claims:

1. A method for heat treating coulter blades comprising a plain high carbon steel plate of generally circular configuration having a plurality of radial corrugations formed on the surfaces thereof with said corrugations beginning inwardly of said plate axis and terminating short of the periphery of said plate to define a substantially flat inner ring adjacent said axis and a substantially flat circumferential margin adjacent said periphery, said method comprising heating said coulter blade to a temperature above the austenitizing temperature of said steel, rapidly quenching said blade to produce retained austenite, after said quenching and with said blade within the temperature range of 200 to 325° F., stacking a plurality of said blades with spacers therebetween to maintain said blades out-of-contact with each other said spacers being provided between each blade adjacent said inner ring and said circumferential margin, compressing said blades axially and prior to said blades cooling below said temperature range annealing the same and cooling to room temperature to achieve an annealed hardness within the range of 380 to 490 Brinell while maintaining said blades in axial compression.

2. A method for heat treating coulter blades comprising a plain high carbon steel plate of generally circular configuration having a plurality of radial corrugations formed on the surface thereof with said corrugations beginning inwardly of said plate axis and terminating short of the periphery of said plate to define a substantially flat inner ring adjacent said axis and a substantially flat circumferential margin adjacent said periphery, said method comprising heating said coulter blade to a temperature above the austenitizing temperature of said steel, rapidly quenching said blade to produce retained austenite, after said quenching and with said blade within the temperature range of 200 to 325° F. stacking in axial alignment a plurality of said blades, providing between each blade in said stack separate spacers adjacent said inner ring and adjacent said circumferential margin, said spacers being of a thickness sufficient to maintain said blades out-of-contact with each other, providing a plate on each end of said stack, each of said plates overlying the blade at each end, compressing said plates axially toward each other to place said blades of said stack in like compression and prior to said blades cooling below said temperature range annealing the same and cooling said blades from annealing temperature to substantially room temperature to achieve an annealed hardness within the range of 380 to 490 Brinell while maintaining said blades in axial compression.

3. The method of claim 2 wherein said compression is achieved by the use of a tie bolt that is passed axially through said blades and said end plates of said stack.

4. The method of claim 3 wherein said compression is achieved by tightening said tie bolt to a torque of at least about 300-foot pounds.

5. The method of claim 2 wherein said coulter blade is austenitized at a temperature of about 1600° F.

6. The method of claim 2 wherein said coulter blade is oil quenched from austenitizing temperature.

7. The method of claim 2 wherein said stack of coulter blades is annealed within the range of 900 to 950° F.

8. The method of claim 2 wherein said steel consists essentially of, in weight percent, .80 to .93 carbon, 1 to 1.3 manganese, .015 max. phosphorus, .015 max. sulfur, .15 to .25 silicon and balance iron.

References Cited

UNITED STATES PATENTS

| 1,535,191 | 4/1925 | Wemp | 148—12.4 |
| 3,510,367 | 5/1970 | Berger | 148—131 |
| 2,066,515 | 1/1937 | Bishop | 148—131 X |
| 2,814,580 | 11/1957 | Hoover | 148—36 |
| 971,628 | 10/1910 | Nickerson | 148—131 |
| 3,237,577 | 3/1966 | Wilkins | 172—604 |

FOREIGN PATENTS

| 825,926 | 10/1969 | Canada | 172—604 |

OTHER REFERENCES

Metals Handbook, 1964, 8th ed., pp. 36–43.

CHARLES N. LOVELL, Primary Examiner

U.S. Cl. X.R.

148—134, 143, 144; 172—604, 747